United States Patent [19]

Iseki

[11] Patent Number: 5,372,172
[45] Date of Patent: Dec. 13, 1994

[54] PNEUMATIC TIRE INCLUDING A CARCASS PLY COMPOSED OF A PLURALITY OF PLY STRIPS

[75] Inventor: Tsutomu Iseki, Fukushima, Japan

[73] Assignee: Sumitomo Rubber Industries, Ltd., Kobe, Japan

[21] Appl. No.: 197,461

[22] Filed: Feb. 16, 1994

Related U.S. Application Data

[63] Continuation of Ser. No. 715,651, Jun. 14, 1991, abandoned.

[30] Foreign Application Priority Data

Jul. 6, 1990 [JP] Japan ................... 2-180180

[51] Int. Cl.⁵ ............... B60C 9/02; B60C 9/04; B60C 9/06; B60C 9/08
[52] U.S. Cl. .................... 152/548; 152/558; 152/559; 152/560; 156/117; 156/133
[58] Field of Search ............ 152/548, 558–561; 156/117, 133–134

[56] References Cited

U.S. PATENT DOCUMENTS

| | | | |
|---|---|---|---|
| 951,869 | 3/1910 | Wirt | 152/559 X |
| 1,142,042 | 6/1915 | Johnson et al. | 152/559 X |
| 1,252,703 | 1/1918 | Kline | 152/559 X |
| 1,918,553 | 7/1933 | Musselman | 152/548 |
| 2,344,827 | 3/1944 | Liermann | 152/559 X |
| 3,240,250 | 3/1966 | Frazier . | |
| 3,431,962 | 3/1969 | Kersker et al. . | |
| 3,826,297 | 7/1974 | Alderfer . | |
| 4,126,720 | 11/1978 | Edwards . | |

FOREIGN PATENT DOCUMENTS

| | | | |
|---|---|---|---|
| 394987 | 2/1909 | France . | |
| 489657 | 3/1919 | France . | |
| 1079230 | 8/1967 | United Kingdom | 156/133 |

*Primary Examiner*—Michael W. Ball
*Assistant Examiner*—Adrienne C. Johnstone

[57] ABSTRACT

A pneumatic tire has a carcass composed of at least one carcass ply extending from a tread part through sidewall parts and turned up around a bead core in each of two bead parts. The carcass ply comprises a plurality of ply strips which are continuously arranged in the tire circumferential direction with overlapping portions, wherein one end in the tire circumferential direction of one ply strip overlaps to an outer surface of an adjacent ply strip adjacently arranged on one end side, and the other end in the tire circumferential direction of the one ply strip overlaps to an inner surface of an adjacent ply strip adjacently arranged on other end side.

1 Claim, 5 Drawing Sheets

PNEUMATIC TIRE INCLUDING A CARCASS PLY COMPOSED OF A PLURALITY OF PLY STRIPS

This application is a continuation of application Ser. No. 07/715,651 filed on Jun. 14, 1991, now abandoned.

The present invention relates to a pneumatic tire which is enhanced in ride comfort and steering stability by improving the uniformity in the circumferential direction of the tire and enhancing the dynamic balance.

BACKGROUND OF THE INVENTION

Conventionally, as shown in FIG. 6, a carcass (a) of the pneumatic tire such as the tire for a passenger car is formed by rolling up a sheet of a carcass ply into the cylindrical shade. Therefore, the above mentioned carcass (a) has an overlapping portion (b) so as to connect the ply edges to each other. The overlapping portion (b) is usually set to be narrow in the tire circumferential direction, that is, the width is set to be not more than 10 mm.

However, in such a conventional tire, the difference in the rigidity of the carcass occurs at the overlapping portion (b), and dynamic balance is deteriorated. As the result, the vibration of the tire while running is generated so as to deteriorate the ride comfort. And also, the overlapping portion causes a uneven difference on the tread surface so that the exterior of the tire is deteriorated.

When the carcass is composed of two or three plies, the difference in the rigidity of the carcass can be mitigated to some degree by shifting the overlapping portions of the plies to the tire circumferential direction. But the dynamic unbalance can not be improved so that restraining the vibration of the tire and enhancing ride comfort are far from being attained.

SUMMARY OF THE INVENTION

It is hence a primary object of the invention to provide a pneumatic tire capable of enhancing ride comfort, steering stability and the exterior of the tire by using a carcass ply composed of plural ply strips continuously arranged in the tire circumferential direction with overlapping portions.

According to one aspect of the present invention, a pneumatic tire having a carcass composed of at least one carcass ply extending from a tread part through sidewall parts and turned up around a bead core in each of two bead parts, wherein the carcass ply is composed of a plurality of ply strips which are successively arranged in the tire circumferential direction with overlapping portions and, also one end in the tire circumferential direction of one ply strip overlaps to an outer surface of an adjacent ply strip adjacently arranged on the one end side, and the other end in the tire circumferential direction of the one ply strip overlaps to an inner surface of an adjacent ply strip adjacently arranged on the other end side.

As mentioned above, a large number of the overlapping portions are uniformly dispersed in the tire circumferential direction by the arrangement of the plural ply strips. Therefore, a partial difference in the rigidity of the carcass is eliminated so as to improve the dynamic balance, thereby enhancing ride comfort and steering stability. Moreover, by eliminating the partial difference of level on the tread surface, the exterior of the tire is improved.

On the other hand, in the case of forming a carcass which has two or three layer structure, such the carcass can be formed by one rolling up process of one carcass ply composed of ply strips, therefore, the working hours to form the carcass can be shortened.

BRIEF DESCRIPTION OF THE DRAWINGS

An embodiment of the present invention will now be described in detail with reference to the accompanying drawings, in which.

DETAILED DESCRIPTION OF THE INVENTION

Figure 2:
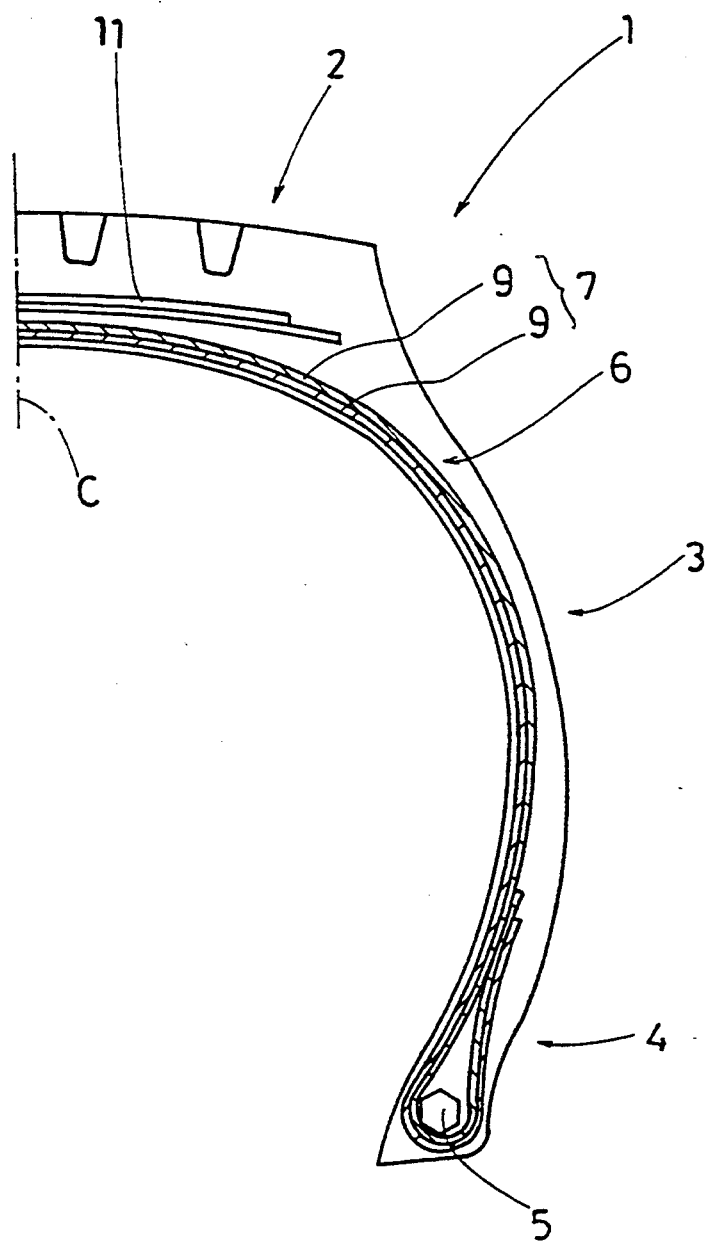
FIG. 2 is a sectional view in the tire axial direction showing an embodiment of the invention.

As shown in FIG. 2, a pneumatic tire 1 has a tread part 2, a pair of sidewall parts 3 extending inwardly in the tire radial direction from both end of the tread part 2, and a pair of bead parts 4 each reinforced by an annular bead core 5 and positioned at inward ends of the sidewall parts 3.

Further, the tire 1 is provided with a carcass 6 extending from the tread pare 2 through sidewall parts 3 and turned up around the bead cores 5, and a belt 11 disposed outside in the tire radial direction of the carcass 6 and inside the tread 2.

The carcass 6 is composed of carcass ply 7 made of plural ply strips 9.

The ply strip 9 has a rectangular sheet shape such that a conventional carcass ply is divided into many pieces in the tire circumferential direction. That is, the ply strip 9 is composed of the carcass cord arrangement wherein the carcass cords are arranged at an angle of 30 to 90 degrees with respect to the tire equator and covered by topping rubber.

As the carcass cords, organic fiber cords, e.g. nylon, polyester, rayon, aromatic polyamide fiber cords can be used.

The carcass ply 7 is formed by arranging the ply strips 9 successively in the tire circumferential direction with overlapping portions which are perpendicular to the circumferential direction. That is, one end E1 in the tire circumferential direction of a ply strip 9a overlaps onto an outer surface of a ply strip 9b adjacent to the ply strip 9a on the end E1 side, and the other end E2 in the tire circumferential direction of the ply strip 9a overlaps onto an inner surface of a ply strip 9c adjacent to tile ply strip 9a on the other end E2 side. By repeating this arranging process, adjacent ply strips 9 and 9 are overlapped and connected to each other sequentially, and the carcass ply 7 is formed into a cylindrical shape.

Figure 3:
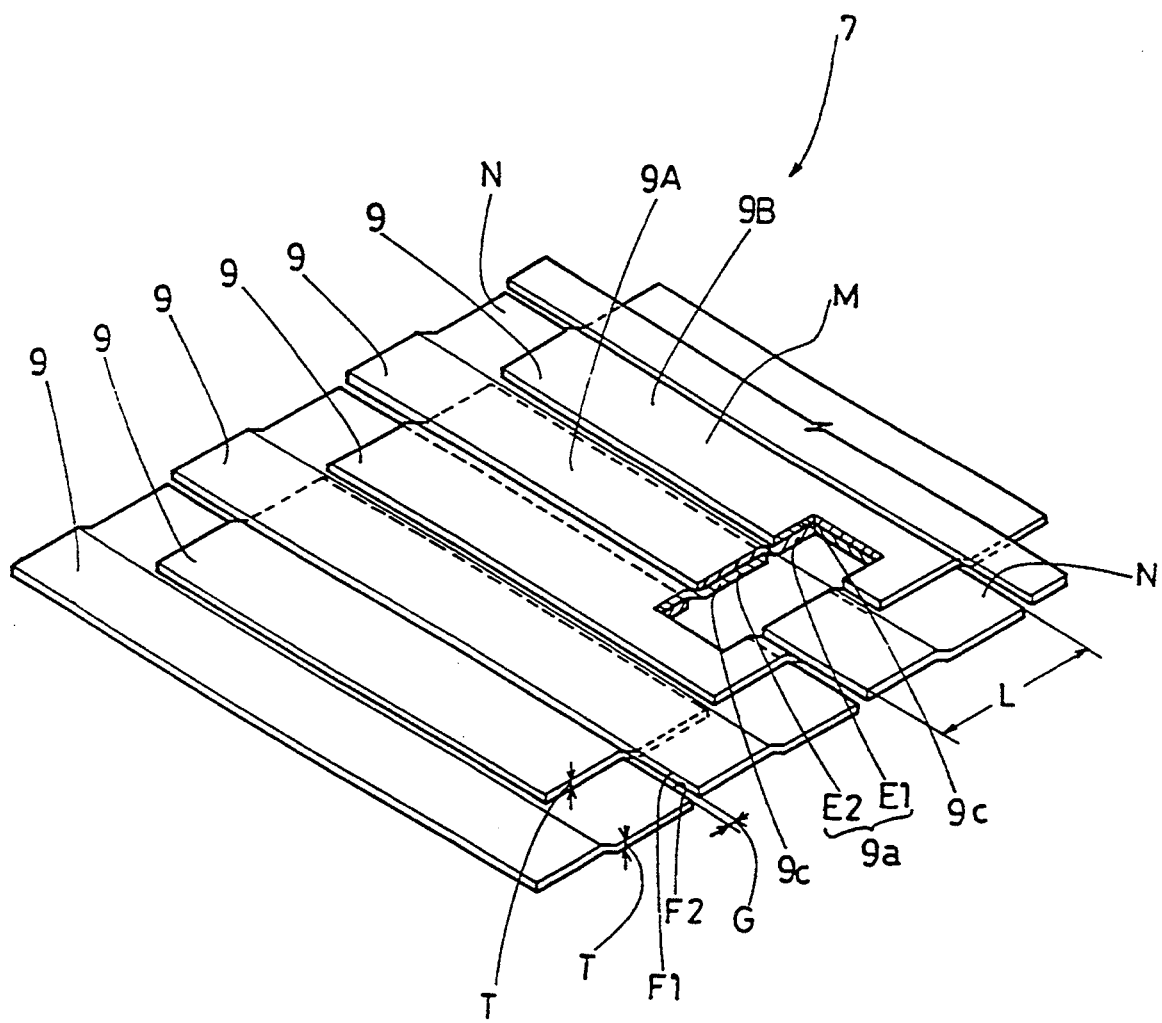
FIG. 3 is a perspective view showing an embodiment of a carcass ply used in the invention.

As shown in FIG. 3, the ply strips 9 are connected sequentially on a plane, thereby the carcass ply 7 is previously formed in a band shape. Further, by overlapping one edge of the precarcass ply 7 to other edge, the carcass 6 rolled up in the tire circumferential direction is formed.

Further, a gap G in the circumferential direction between the end F1 of the adjacent ply strip 9b overlapped to one end E1 of the strip 9a and the end F2 of the adjacent ply strip 9c overlapped to other end E2 of the strip 9a is preferably set to be three times the thickness T of the ply strip 9 or less.

By specifying the gap G In the above range, two ply strips 9 and 9 overlap each other in approximately whole area of the carcass ply 7, as the result, in this embodiment, carcass 6 which has a two layer structure is formed with one carcass ply 7.

Figure 1:
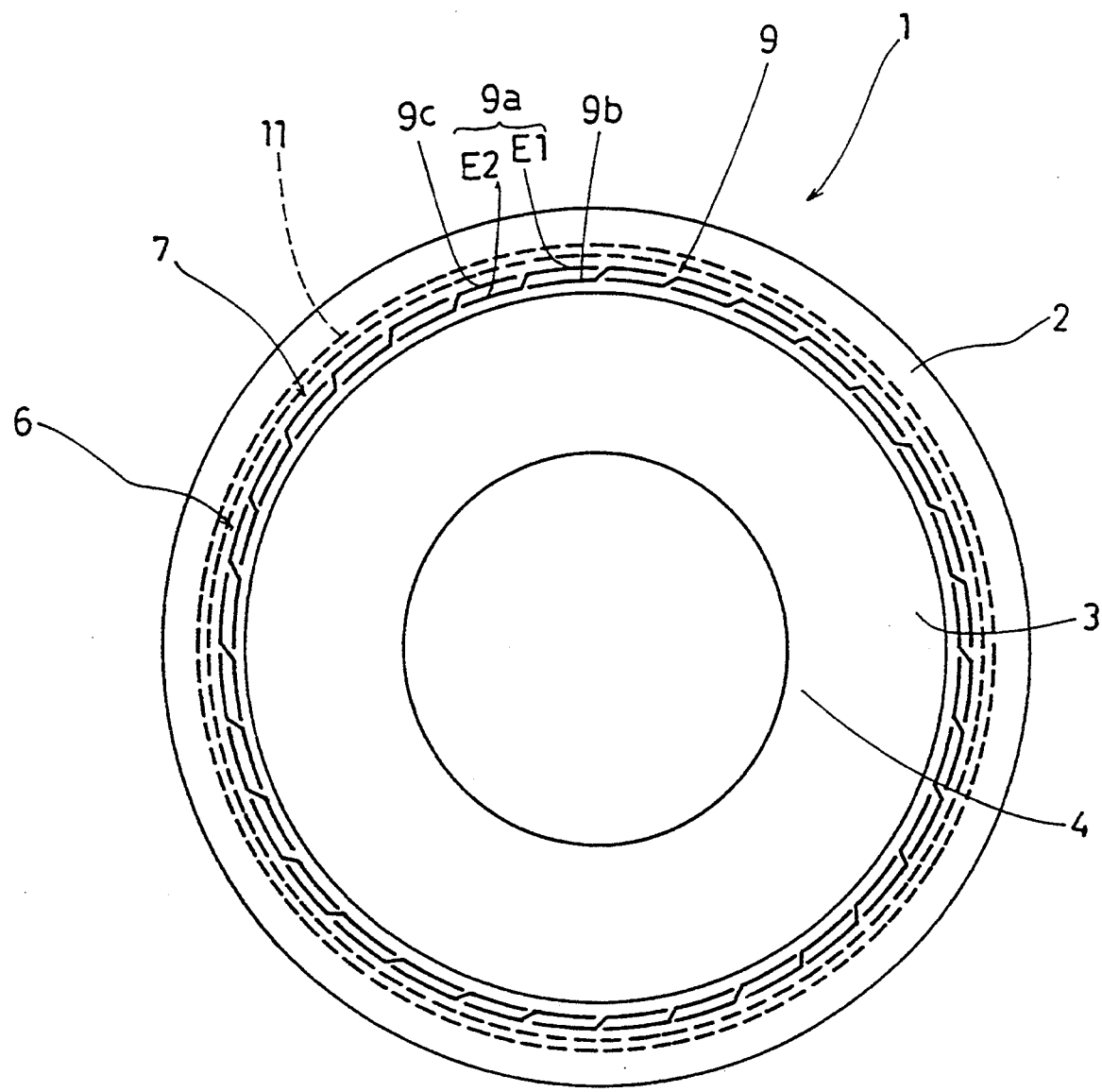
FIG. 1 is a sectional view taken on the equatorial plane of a tire showing an embodiment of the invention.
Figure 4:
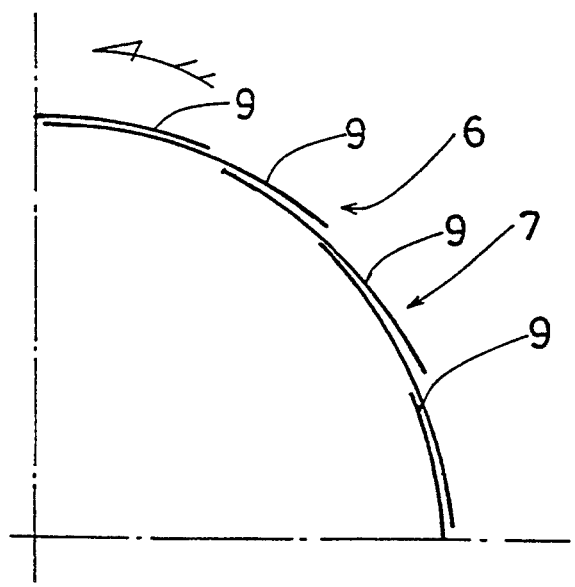
FIG. 4 is a sectional view showing another embodiment of carcass.
Figure 6:
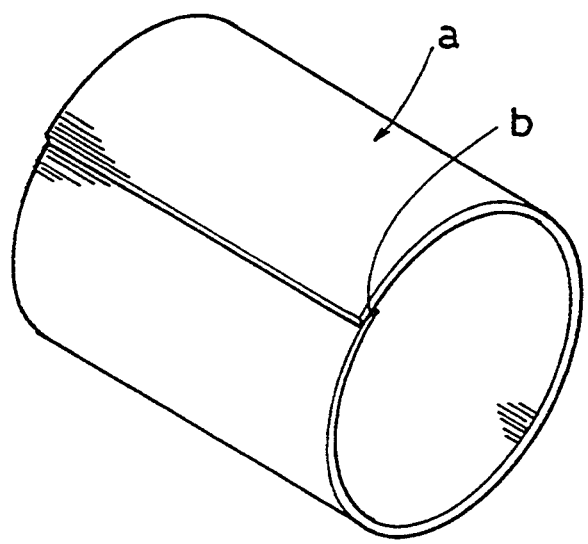
FIG. 6 is a perspective view showing a prior art carcass.

The ply strip 9, also, has a bent step portion between one end E1 and the other end E2, as shown In FIGS. 1 and 3, and the outer surfaces of ply strips 9a and 9b adjacent to each other are smoothly continuous by this step portion. Although, the ply strips 9 may be overlapped scale-like without bending the ply strips, as shown in FIG. 4.

Further, the width L in the tire circumferential direction of the ply strip 9 is set in the range of from 10 mm to 600 mm, preferably from 10 mm to 400 mm. If the width L exceeds 600 mm, the difference of the rigidity at the overlapping portions from other portions is remarkably large, thereby the dynamic unbalance of the tire occurs, and running stability and ride comfort are deteriorated. Moreover, the rigidity at the overlapping portions becomes increased because the width of the overlapping portions becomes large. As a result, the carcass 6 shows a tendency to become a polygon shape when rolling up the carcass ply, thereby the exterior of the tire is deteriorated. If the width L is not more than 400 mm, the above mentioned problem is perfectly solved.

On the other hand, if the width L is not more than 10 mm, the joint strength between the ply strips 9a and 9b is reduced and the cost for making the carcass is increased.

It is, also, preferable that the carcass 6 is formed by ply strips 9 of 10 to 50 per one tire for the same reason of the restraint of the width L.

In this embodiment, the ply strips are classified into a group of ply strips 9A having a long length in the tire axial direction and a group of ply strips 9B having a short length in the tire axial direction, and the ply strip 9A and the ply strip 9B are alternatingly arranged in the tire circumferential direction.

Therefore, when the gap G is set narrower, such the carcass 6 as the conventional carcass having a two layer structure, that is, the carcass wherein the thickness at the center portion M of the carcass 6 is two times the thickness at both end portions N is formed at one effort.

Figure 5:
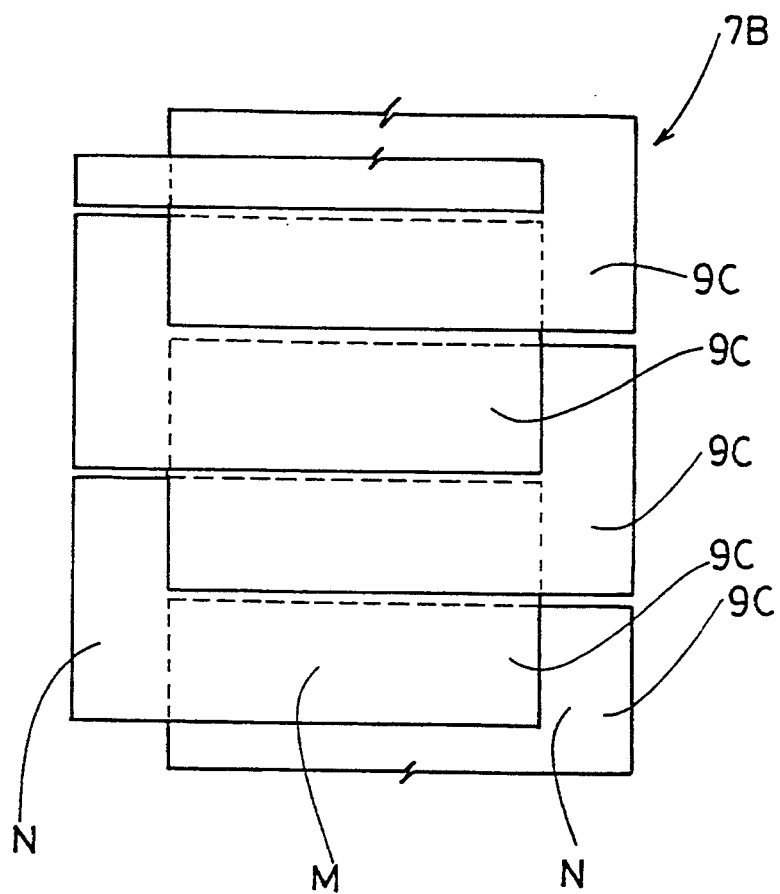
FIG. 5 is a plan view showing another embodiment of carcass ply.

FIG. 5 shows another embodiment in which the thicknesses at the center portion M and end portions N are different from each other. In this embodiment, ply strips 9C have the same length in the tire axial direction to each other, and one ply strip and the adjacent ply strip are mutually shifted in the tire axial direction.

Further, the carcass may be formed by overlapping the ply strips into more than a two layer construction.

The belt 11 is composed of, in this embodiment, two plies of parallel cords which cross the carcass cords. As the belt cords, steel cords and organic fiber cords, e.g. nylon, polyester, aromatic polyamide fiber cords can be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A pneumatic tire having a carcass including at least one carcass ply extending from a tread part through sidewall parts and turned up around a bead core disposed in each of two bead parts, wherein;

said carcass ply includes a plurality of ply strips which are successively arranged in the tire circumferential direction with overlapping portions and are arranged perpendicular to the circumferential direction, each of the plurality of ply strips having a rectangular shape and a width in the tire circumferential direction in a range of 10 mm to 600 mm, each end in the tire axial direction of each of the plurality of ply strips being turned up around one of the bead cores;

said ply strips are 10 to 50 in number;

one end in the tire circumferential direction of one ply strip overlaps to an outer surface of an adjacent ply strip adjacently arranged on said one end side, and the other end in the tire circumferential direction of said one ply strip overlaps to an inner surface of an adjacent ply strip adjacently arranged on said other end side;

a gap in the tire circumferential direction between the ends of said two adjacent ply strips each overlapping to said one ply strip on both sides is set to be three times the thickness of the ply strip or less; and said ply strips are of equal length in the tire axial direction and one ply strip and the adjacent ply strip are mutually shifted in the tire axial direction.

* * * * *